United States Patent [19]

Heekin

[11] Patent Number: 4,714,373

[45] Date of Patent: Dec. 22, 1987

[54] PICTURE FRAME CLAMP

[75] Inventor: Theodore R. Heekin, Bay Villiage, Ohio

[73] Assignee: Valco/Valley Tool & Die, Inc., North Royalton, Ohio

[21] Appl. No.: 875,922

[22] Filed: Jun. 19, 1986

[51] Int. Cl.⁴ .............................................. F16B 12/50
[52] U.S. Cl. ..................................... 403/402; 40/155; 40/152
[58] Field of Search .................. 40/155, 152; 403/401, 403/402, 403, 295

[56] References Cited

U.S. PATENT DOCUMENTS 4,122,617 10/1978 Nielsen ................................ 403/401
4,516,341 5/1985 Jenkins ................................ 403/402
4,610,565 9/1986 Nakayama .......................... 403/402

Primary Examiner—Henry E. Raduazo
Attorney, Agent, or Firm—Harlan E. Hummer

[57] ABSTRACT

A clamping device for holding adjacent framing members of a metal picture frame together in mitered relation, is described as having an L-shaped steel plate comprised of two outstanding legs. Each leg is provided with a rotatable lever with a special cam that is designed to contact the framing members to cause frictional engagement between the legs and adjacent members when the members are in mitered relation.

12 Claims, 5 Drawing Figures

PICTURE FRAME CLAMP

BACKGROUND OF INVENTION

The invention relates to picture frames, especially clamps that are used to hold the mitered corners of a popular, contemporary metal picture frame together. This particular frame is composed of metal framing members that have rearwardly facing, recessed channels that are defined between a flat bottom and a pair of opposing flanges which are spaced to form between them a slot which extends longitudinally of the channel and members.

At present, the clamping device used for holding the mitered corners of adjacent framing members together, consists of an L-shaped plate with outstanding legs that are designed to fit in the channels of adjacent members. A conventional machine screw is provided in each of the legs to securely fasten a plate within the intersecting channels of each mitered corner. The invention is directed to the provision of a self-operating clamp which needs no outside tool for its operation.

SUMMARY OF INVENTION

Briefly stated, the invention is an L-shaped clamp which is positioned in the intersecting recesses of a pair of mitered metal framing members, as outlined above. A lever is rotatably mounted on each of the legs of the clamp. Each of the levers is provided with a special cam which is designed to compressively engage the channel bottom and lift the plate into frictioned engagement with the flanges of the channel to secure the mitered corners of the frame together. The frame is easily disassembled by rotating the levers to their unlocked positions where the cams become disengaged from the channel bottom.

DESCRIPTION OF DRAWING

The following description of the drawing will be better understood by having reference to the accompanying drawing, wherein.

ENVIRONMENT OF INVENTION

Figure 1:
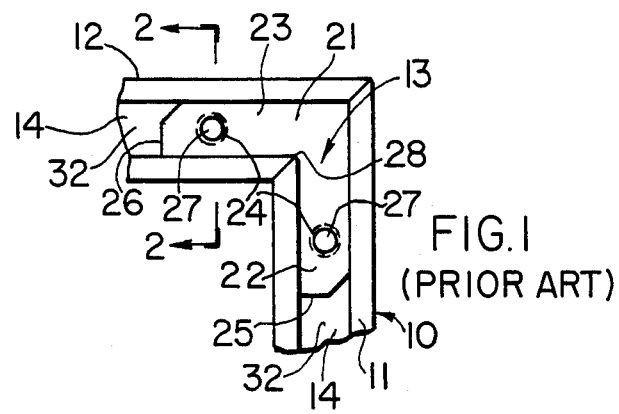
FIG. 1 is a plan view of a mitered corner of a picture frame showing a prior art clamp.
Figure 2:
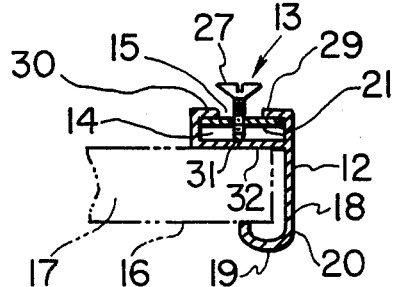
FIG. 2 is a section viewed from the line 2—2 of FIG. 1.

With general reference to the drawing for like parts and particular reference to FIGS. 1 and 2, there is shown a portion of a metal picture frame 10 comprised of two metal framing members 11, 12 that are joined together in mitered relation by means of a special clamping device 13.

Each of the metal framing members 11, 12, as best seen in FIG. 2, comprises an enclosed channel 14 with a rearwardly facing slot 15, relative to the face 16 of a picture 17 being frame, which extends longitudinally of the members 11, 12. An A-shaped member 18 with a reversely curved hook portion 19, extends from the channel 14 to form a smooth, finished outer surface 20 surrounding and framing the picture 17.

The clamping device 13 comprises, a rigid, flat L-shaped metal plate 21 which has a pair of outstanding legs 22, 23 which are at right angles to each other. A threaded hole 24 is disposed adjacent the free distal ends 25, 26 of the legs 22, 23, for receiving a conventional machine screw 27.

In operation, four framing members are mitered, to length, to form the picture frame 10. One of the legs 22 of the clamp 13 is slidably inserted in the open channel 14 of the first framing member 11, until the other leg 23 abuts the inside mitered edge 28 of the framing member 11, after which the locking machine screw 27 is tightened to move the leg 22 outwardly into compressive engagement with the channel flanges 29, 30 on either side of the slot 15, as the threaded end 31 of the screw 27 engages the bottom plate 32 of the channel 14. Thus, the leg 22 of the clamp 13 is firmly locked to the framing member 11. This operation is repeated to lock the other leg 23 of the clamp 13 to the adjacent framing member 12 when it is brought into mitered relation with the first framing member 11. It can be appreciated that a screwdriver is needed to move the clamps into frictional engagement with the framing members. The following described invention eliminates the need for any outside tools to operate the clamps.

THE INVENTION

Figure 4:
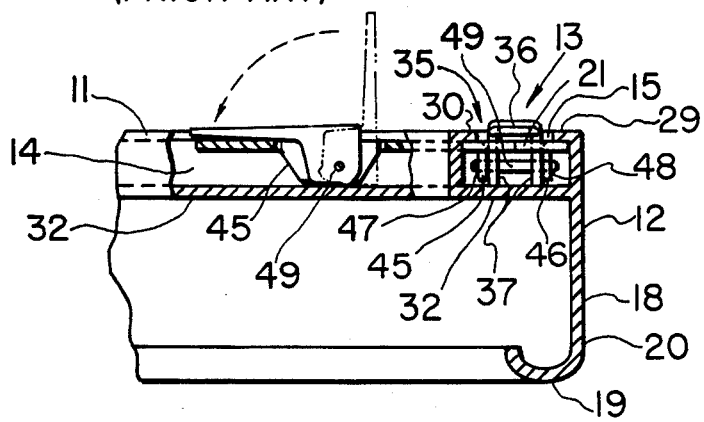
FIG. 4 is a section viewed from the line 4—4 of FIG. 3.
Figure 3:
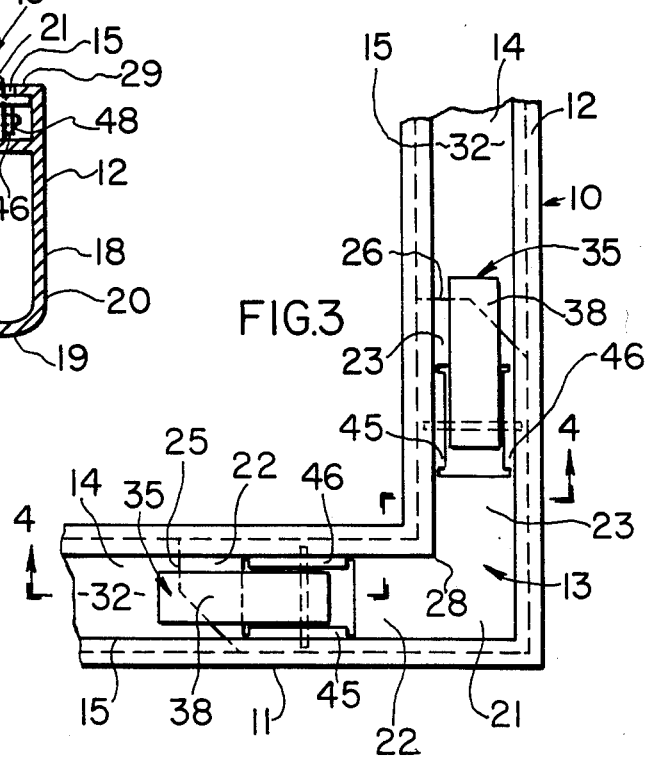
FIG. 3 is a similar plan view of a mitered corner held together by a clamp that is made in accordance with the invention.
Figure 5:
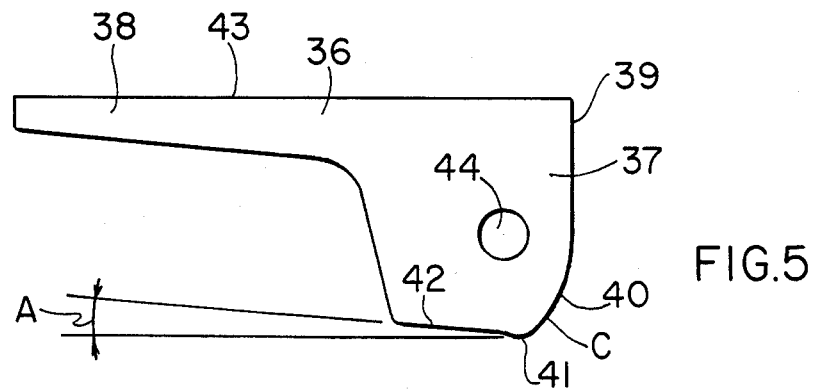
FIG. 5 is a side view of the dipper-shaped lever of the clamp, showing the special cam surface for engaging the metal picture framing members.

With reference to FIGS. 3–5, the machine screws 27 in the legs 22, 23 of the clamp 13 are replaced by a unique cam mechanism 35 which is rotatable into and out of engagement with the bottom plate 32 of the channel 14 to move the attached L-shaped plate 21 into compressive engagement with the overhead flanges 29, 30 bordering the slot 15.

The cam mechanism 35 comprises a dipper-shaped lever 36 (FIG. 5) which includes a body portion 37 from which a handle portion 38 extends. The body portion 37 has a flat, front face 39 which leads to a cam C in the form of a curved surface 40 that terminates at a small bulbous portion or detent 41 which is accentuated by sloping the flat surface 42, extending beyond the detent 41, in converging relation towards the handle 38 at an angle A of 4°, relative to a plane that is parallel to the upper planar surface 43 of the handle 38, to permit rotation of the handle 38 slightly more than 90° between an unlocked position of the lever 36, where the handle surface 43 is normal to, and the cam C is disengaged from, the channel bottom 32, and a locked position of the lever 36 where the handle 38 abuts the adjacent leg 22, 23 and the cam C engages the channel bottom 32. FIG. 4 also shows the lever 36 to have an inverted U-shape, whereby there are two identically shaped body portions 37 in parallel relation. This is so, because the lever 36 is formed in a stamping operation of lightweight sheet steel. A pair of similar, aligned pinholes 44 are disposed in the twin body portion or bodies 37.

A pair of downwardly (towards the channel bottom 32) directed, parallel ears 45, 46 are punched from each of the legs 22, 23 of the flat steel plate 21, the opening or spacing between the ears 45, 46 being sufficient to accomodate the twin bodies 37 of the lever 36. The ears 45, 46, are provided with similar, aligned pin holes 47, 48. The levers 36 are rotatably mounted on the ears 45, 46 of each of the legs 22, 23 of the clamping device 13 by means of a pivot pin 49 which extends through the aligned pin holes of the twin bodies 37 and ears 45, 46.

The construction of a picture frame, using the clamping device 13 with the cam mechanism 35, is essentially as described before, except that, when the legs 22, 23 are successively inserted in the intersecting channels 14 of the framing members 11, 12, each lever 36 is rotated from its upright unlocked position to its downward locked position where the handle 38 abuts the adjacent leg of the clamp plate 21. As the levers 36 are rotated, the cam surfaces 40 and detents 41 rollingly engage the channel bottom 32 and force the clamp plate 21 into compressive engagement with the flanges 29, 30 that border the slot 15. It can be appreciated by those skilled in the art that the levers 36 are so positioned that when they are rotated, the curved cam surfaces 40 and detents 41 will coact with the adjacent channel bottom 32 to move the framing members 11, 12 into tighter mitered relation by forcing each of the members 11, 12 towards the other leg of the L-shaped plate. It can also be appreciated that by rotating the handle 38 slightly more than 90° to its locked position, the detent 41 will finally come to rest against the channel bottom 32 slightly beyond its peak to provide a strong, positive interlock between the clamping device 13 and framing members 11, 12 to prevent separation of the mitered corners of the picture frame 10.

Thus, there has been described a unique clamping device used in the construction of a modern metal picture frame. The device is simple to operate and does not require any outside tools for its operation. Also, the device acts to tighten the mitered joints between adjacent framing members, which tightening is presenly accomplished by hand. The picture frame can be readily assembled and disassembled simply by rotating the levers of the clamping device into and out of compressive engagement with the bottom plate of the channel formed along the back edge of the frame.

What is claimed is:

1. A clamping device used in the construction of a metal picture frame which is formed of metal framing members that are joined in mitered relation, each of the members having an enclosed channel with a longitudinally extending slot that is bordered by a pair of flanges which are spaced in parallel relation from a channel bottom, the device comprising:
    (a) an L-shaped rigid plate having a pair of outstanding legs which are at right angles to each other;
    (b) a rotatable lever associated with each of the legs, the levers each having a cam and a connecting handle which a person uses to rotate the lever and
    (c) means mounting the levers on the legs for rotation about an axis which is normal to the longitudinal axes of the channel and slot, the mounting means, handle and cam of each lever being disposed in relation to each other such that the cam will engage the channel bottom while remaining free of the flanges and simultaneously force the rigid plate against adjacent flanges of the framing members and cause relative movement between the framing members and legs, whereby adjacent framing members are moved into tighter mitered relation, when the handle is rotated from an unlocked position where the cam is disengaged from the channel bottom, to a locked position where the handle abuts the adjacent leg of the plate in farthest spaced relation from the other leg.

2. The clamping device of claim 1, wherein the lever is dipper-shaped and includes a pinhole between the handle and cam.

3. The clamping device of claim 2, wherein the cam includes a curved cam surface which terminates at a bulbous portion which is designed to compressively engage the channel bottom when the handle is in a locked position.

4. A clamping device used in the construction of a metal picture frame which is formed of metal framing members that are joined in mitered relation, each of the members having an enclosed channel with a longitudinally extending slot that is bordered by a pair of flanges which are spaced in parallel relation from a channel bottom, the device comprising:
    (a) a flat, L-shaped plate having a pair of outstanding legs which are at right angles to each other, each of the legs having an opening therein with opposing ears that project in parallel relation from the plane of the plate, the ears of each opening having aligned pinholes with coincidental center axes that are normal to the longitudinal axis of the leg in which the opening is located;
    (b) a dipper-shaped lever rotably mounted between each pair of ears, the lever comprised of a single handle connecting a U-shaped body portion of identical twin bodies which have aligned pinholes for alignment with the pinholes of the ears, and a pair of curved cam surfaces which terminate at bulbous portions which are designed to engage the bottom of the channel and lift the plate into compressive relation with the flanges bordering the slot, when the handle is rotated from a plane, which is normal to the plane of the channel bottom, to a plane where the handle is in abutting relation with the adjacent leg; and
    (c) a pivot pin disposed in the aligned pinholes of the levers and ears, and about which the lever rotates.

5. The clamping device of claim 4, wherein the handle and each twin body have flat surfaces which are normal to each other, the cam surfaces of the twin bodies extending from the flat surfaces in a reverse direction towards the free end of the handle, the twin bodies beyond the cam surfaces and bulbous portions including flat surfaces which extend from the bulbous portions in converging relation towards the free end of the handle.

6. The clamping device of claim 5, wherein the angle (A) between the flat surface of the handle and the flat surface converging from each bulbous portion towards the handle is 4°.

7. In combination:
    (a) a picture frame comprised of four framing members in mitered relation, each of the members having a configured front edge for surrounding a picture to be framed and a back edge which is spaced from the front edge and which has an enclosed channel therealong with a rearwardly facing slot that is bordered by a pair of flanges which extend longitudinally of the back edge and which are spaced from a flat channel bottom;
    (b) a clamping device coacting between adjacent mitered framing members for holding together mitered corners of the picture frame, each device including:
        (I) an L-shaped rigid plate having a pair of outstanding legs which are at right angles to each other and which are positioned in intersecting channels of adjacent mitered members, each of the legs having an opening with parallel ears projecting from opposing sides of the opening in the direction of the channel bottom, the ears having aligned pinholes therein equally spaced from the channel bottom;

(II) a dipper-shaped lever rotatably mounted between each pair of ears, the lever having a handle extending from a body portion with a cam surface for engaging the channel bottom and moving the plate into compressive contact with the channel flanges, when the handle is rotated into contact with the plate; and (III) means mounting the lever between the ears for rotation about an axis which is normal to the longitudinal axes of the channel and slot.

8. The combination of claim 7, wherein the body portion of the lever includes identical twin bodies, and the lever mounting means includes, (i) aligned pinholes in the twin bodies between the handle and cam surfaces, and (ii) a pivot pin in the aligned pinholes of the twin bodies and adjacent ears.

9. The combination of claim 8, wherein the handle has a flat surface intersecting and at right angles to a flat surface on each of the twin bodies, and the cam surface includes a curved surface curving inwardly from the flat surface of each of the twin bodies in the direction of the handle and terminating at a bulbous portion, a portion of each of the twin bodies beyond the bulbous portion and curved surface being flat and converging from the bulbous portion in the direction of the handle.

10. The combination of claim 9, wherein the included angle (A) between the flat surface of the handle and each of the flat surfaces converging towards the handle is at least 4°.

11. A clamping device used in the construction of a metal picture frame which is formed of metal framing members that are joined in mitered relation, each of the members having an enclosed channel with a longitudinally extending slot that is bordered by a pair of flanges which are spaced in parallel relation from a channel bottom, the device comprising:

(a) an L-shaped rigid plate having a pair of outstanding legs which are at right angles to each other;

(b) a dipper-shaped rotatable lever associated with each of the legs, the levers each being generally U-shaped and having a pair of identical twin body portions with a single connecting handle which a person uses to rotate the lever, the twin body portions having aligned cam surfaces which terminate at bulbous portions which are designed to compressively engage the channel bottom when the handle is in a locked position, the twin body portions including aligned pinholes between the handle and bulbous portions; and (c) means mounting the levers on the legs for rotation about an axis which is normal to the longitudinal axes of the channel and slot, the mounting means, handle and cam of each lever being disposed in relation to each other such that the cam will engage the channel bottom and force the rigid plate against adjacent flanges of the framing members, when the handle is rotated from an unlocked position where the cam is disengaged from the channel bottom, to a locked position where the handle abuts the adjacent leg of the plate.

12. The clamping device of claim 11, wherein the bulbous portion is designed such that a portion thereof, slightly beyond the cam surface and peak of the bulbous portion, engages the channel bottom when the handle abuts the adjacent leg.

* * * * *